United States Patent [19]

Yoshida et al.

[11] Patent Number: 4,519,963
[45] Date of Patent: May 28, 1985

[54] ELECTROCONDUCTIVE CROSS-LINKED POLYOLEFIN FOAM AND METHOD FOR MANUFACTURE THEREOF

[75] Inventors: Iwao Yoshida, Kyoto; Takeo Kasanami, Joyo; Shuji Miura, Uji, all of Japan

[73] Assignee: Sanwa Kako Company Limited, Kyoto, Japan

[21] Appl. No.: 495,406

[22] Filed: May 17, 1983

[30] Foreign Application Priority Data

May 17, 1982 [JP] Japan .................................. 57-81618

[51] Int. Cl.³ ............................................. B29J 1/02
[52] U.S. Cl. .................................... 264/45.3; 264/54; 264/DIG. 18; 521/79; 521/82; 521/96; 521/143; 521/915
[58] Field of Search ................... 521/82, 915, 79, 143, 521/96; 264/54, 45.3, DIG. 18

[56] References Cited

U.S. PATENT DOCUMENTS

| | | | |
|---|---|---|---|
| 3,098,831 | 7/1963 | Carr | 521/915 |
| 4,379,098 | 4/1983 | Gumienny | 264/DIG. 45 |
| 4,431,575 | 2/1984 | Fujie et al. | 521/79 |

*Primary Examiner*—Morton Foelak

*Attorney, Agent, or Firm*—Armstrong, Nikaido, Marmelstein & Kubovcik

[57] ABSTRACT

An electroconductive cross-linked polyolefin foam having electric resistance of not more than 100 MΩ and comprising uniform minute cells and proving useful for the production of IC cases, etc. is provided by a method which comprises kneading 100 parts by weight of a polyolefin, 10 to 30 parts by weight of carbon particles, and suitable amounts of a foaming agent and a cross-linking agent and heating the resultant cross-linkable and foamable composition under atmospheric pressure thereby allowing the composition to be cross-linked and foamed without being abruptly foamed or expanded or by a method which comprises heating the aforementioned cross-linkable and foamable composition in a metal mold under pressure to a temperature at which the foaming agent is not substantially decomposed thereby cross-linking the composition and then heating the resultant cross-linked foamable composition under atmospheric pressure thereby allowing the composition to be foamed without being abruptly foamed or expanded. The aforementioned cross-linking may be effected by irradiation of the composition with an electron beam.

24 Claims, 1 Drawing Figure

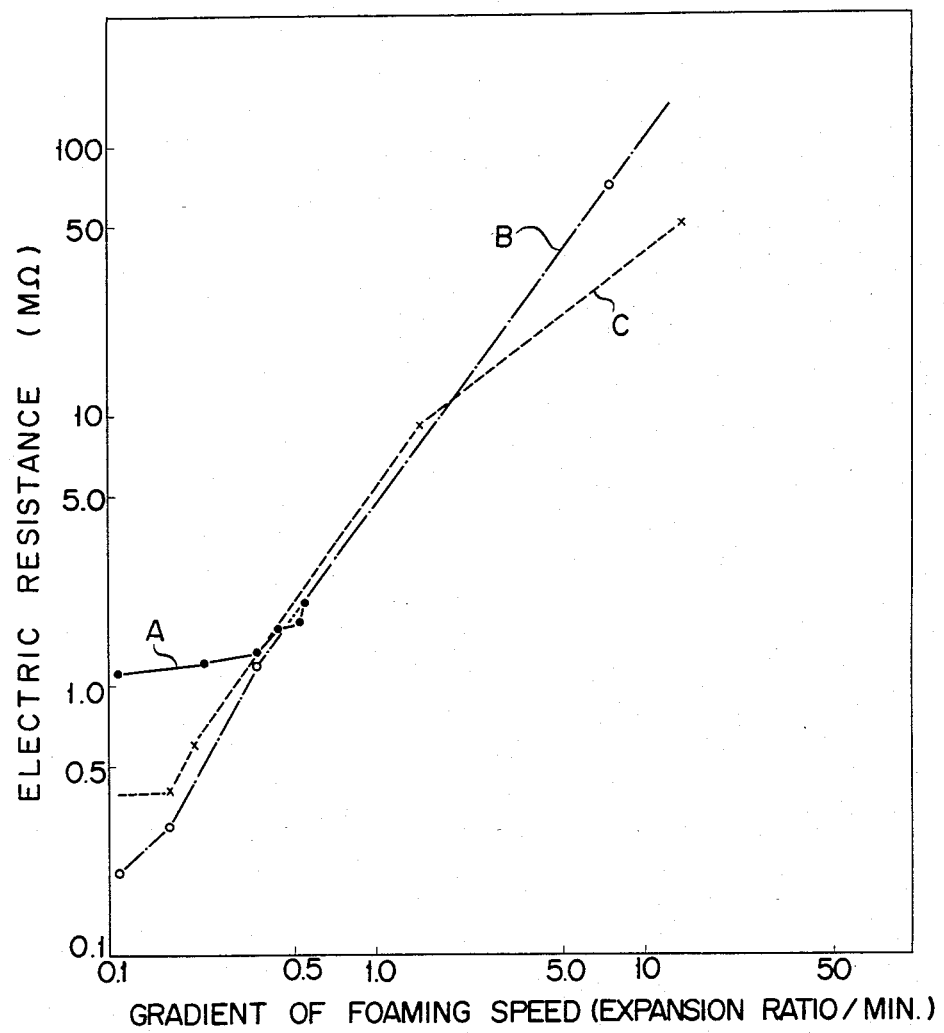

ELECTROCONDUCTIVE CROSS-LINKED POLYOLEFIN FOAM AND METHOD FOR MANUFACTURE THEREOF

BACKGROUND OF THE INVENTION

1. Field of the Invention

This invention relates to an electroconductive cross-linked polyolefin foam and to a method for the manufacture thereof.

2. Description of the Prior Art

Heretofore in the manufacture of resin foam, it has been customary to incorporate as an inorganic filler an oxide, a hydroxide, a carbonate, a sulfate, or a silicate of varying metal, a silicate mineral, or a silica mineral into the resin being foamed. The resin foam which is consequently produced varies with the kind of resin and that of the filler and possesses merits and demerits of its own. It is put to special applications which such characteristics particularly suit.

In recent years, the advances in integrated circuits (IC's) have been encouraging conversion of electric products into electronic countertypes. Despite their numerous features, the IC's suffer from the disadvantage that they are highly vulnerable to static electricity. The accidents experienced during the manufacture or assemblage of IC's are caused more often than not by the electrification of workers and the accidents during the packaging or carriage of finished IC's products are predominantly caused by the electrification of trays and containers.

For the purpose of protecting IC's against the static electricity due to contact of IC's with workers' bodies and the static electricity due to exposure of IC's to vibrations or frictions in the course of carriage, composite electroconductive materials based on various plastics have been utilized in IC cases, IC carrier magazines, etc.

In the circumstances, polyurethane foam has won recognition as a plastic foam possessing electroconductivity. As a technique available for the manufacture of polyurethane foam, there has been proposed a method which comprises foaming polyurethane, impregnating the resultant foam with a carbon paint, and drying the wet foam or a method which comprises foaming polyurethane and impregnating the resultant foam with a solution consisting of a water-dispersible carbon black-containing high molecular resin composition and a water-dispersible binder thereby affording an electroconductive polyurethane foam (Japanese Patent Publication SHO 52(1977)-36902).

The electroconductive polyurethane foam which is obtained by such a method as described above, however, suffers from exudation of carbon or loss of color. Thus, it calls for highly delicate handling and has the possibility of entailing the issue of environmental pollution. Further, the polyurethane foam is quite deficient in weatherability because it is produced from polyurethane. By this and other various reasons, the conventional polyurethane foam has been used under highly restricted conditions.

Polyolefin resins exhibit highly desirable weatherability as compared with polyurethane. They also enjoy outstanding stability to resist the actions of chemicals and water. Only if there is developed a method which is capable of conferring electroconductivety upon the cross-linked polyolefin foam enjoying such outstanding properties as mentioned above, the method is expected to materialize the manufacture of an electroconductive cross-linked polyolefin foam which will suffer from none of the aforementioned drawbacks inherent in the conventional electroconductive polyurethane foam, find utility in a notably widened range of applications, and prove to be highly useful.

According to literature, however, it has been held resignedly that the incorporation of carbon particles into the resin composition fails to confer the desired electroconductivity upon the finally produced foam because, during the blending of the resin composition with the carbon particles, the kneading machine such as a mixing roll exerts shearing stress upon the resin composition and, consequently, brings about destruction on the structure of carbon particles and on the chains of carbon particles. Thus, a review of patent literature reveals that none of the patent applications so far filed has covered an electroconductive cross-linked polyolefin foam of the type having carbon particles incorporated therein by kneading.

SUMMARY OF THE INVENTION

It is, therefore, an object of this invention to furnish a perfect solution of the difficult problems inherent in the conventional electroconductive foams and to provide a highly electroconductive cross-linked polyolefin foam of the type having carbon particles incorporated therein by kneading, which foam is free from exudation of carbon from the resin and is producible at a high expansion ratio as well as a low expansion ration.

Another object of this invention is to provide a method which permits relatively simple and economical manufacture of an electroconductive cross-linked polyolefin foam possessing outstanding properties as described above.

To accomplish the aforementioned objects and other objects, according to the present invention, there is provided an electroconductive cross-linked polyolefin foam which has carbon particles contained substantially in the shape of chains in the cell membranes of the polyolefin foam, exhibits electric resistance of a value of not more than 100 MΩ, and comprises fine cells uniform in size.

In accordance with this invention, the electroconductive cross-linked polyolefin foam described above is obtained by a method which comprises kneading 100 parts by weight of a polyolefin with 10 to 30 parts by weight of carbon particles and suitable amounts of a foaming agent and a cross-linking agent and heating the resultant cross-linkable and foamable composition under a atmospheric pressure so as to allow the composition to be foamed without being abruptly foamed or expanded. In this case, the manufacture of the foam may be otherwise accomplished by heating the cross-linkable and foamable composition in a mold under application of pressure to a temperature at which the foaming agent is not substantially decomposed thereby cross-linking the aforementioned composition and then heating the resultant cross-linked foamable composition under atmospheric pressure so as to allow the composition to be foamed without being abruptly foamed or expanded.

The aforementioned electroconductive cross-linked polyolefin foam can also be obtained by a method which comprises blending 100 parts by weight of a polyolefin with 10 to 30 parts by weight of carbon particles and a suitable amount of a foaming agent, irradiating the resultant foamable composition with an electron beam thereby cross-linking the composition and then heating the resultant cross-linked foamable composition under atmospheric pressure so as to allow the composition to be foamed without being abruptly foamed or expanded.

BRIEF DESCRIPTION OF THE DRAWING

The single FIGURE is a graph showing the relation between the magnitude of electric resistance and the gradient of foaming speed.

DETAILED DESCRIPTION OF THE INVENTION

Polyolefins have volume resistivity in the range of $10^{15}$ to $10^{16}$ Ω-cm and exhibit outstanding electric insulation, and find utility in a rich variety of electric insulating materials. Despite these merits, they have the disadvantage that they tend to assume static electricity and, once they are electrified, they discharge the electricity with great difficulty. When a polyolefin possessing such properties is made to incorporate therein an amount of carbon particles enough for the polyolefin to acquire electroconductivity, the flowability of the resin is seriously degraded and the mechanical properties of the resin are also degraded. In accordance with the knowledge prevalent to date, it is held that by the incorporation of carbon particles, the polyolefin acquires viscoelasticity appropriate for its foaming with difficulty and that manufacture of an electroconductive cross-linked polyolefin foam of the type having carbon particles incorporated therein by kneading is infeasible.

The study conducted by the inventors, however, has ascertained that the extent of electroconductivity or the magnitude of electric resistance in a foaming composition incorporating carbon particles therein heavily hinges on the speed at which the composition gains in volume during the foaming or expanding thereof. It has been further ascertained that the electroconductivity is directly proportional to the content of carbon particles, that chains of carbon particles cannot be formed when the content of carbon particles is small, and that when the content of carbon particles is excessively large, the flowability of the resin is notably lowered to render the production of foam of the resin composition difficult. The inventors' diligent study on these phenomena has resulted in the discovery that when the requirements that a foamable polyolefin composition should be heated under atmospheric pressure so as to allow the composition to be foamed without being abruptly foamed or expanded and that the content of carbon particles in the composition should be limited to within a specific range are satisfied, there is obtained an electroconductive cross-linked polyolefin foam comprising uniform, minute cells of a desired expansion ratio up to about 30 without impairing the outstanding properties of the polyolefin.

The present invention has been perfected on the basis of the knowledge described above. This invention contemplates adoption of either of the two basic methods to be described herein below for the manufacture of an electroconductive cross-linked polyolefin foam.

The first method comprises blending 100 parts by weight of a polyolefin with 10 to 30 parts by weight of carbon particles and suitable amounts of a foaming agent and a cross-linking agent and heating the resultant cross-linkable and foamable composition under atmospheric pressure so as to allow the composition to be cross-linked and foamed without being abruptly foamed or expanded.

In this case, it is advisable that the cross-linkable and foamable composition, prior to the aforementioned heating under atmospheric pressure, may be shaped to desired shape by the application of heat and pressure under conditions such that the foaming agent will be prevented from being substantially decomposed. This preliminary shaping proves to be advantageous because it simplifies the following steps of treatment and improves the yield of manufacture.

In the method described above, for the purpose of allowing the foaming of the composition to proceed gradually, conferring ideal electroconductivity upon the produced foam, and imparting to the produced foam a structure of uniform, minute cells of a high expansion ratio particularly exceeding the level of 15, it is desired that the cross-linking and foaming of the composition by the aforementioned heating under atmospheric pressure may be carried out in two separate steps of heating, i.e., the first heating intended to effect decomposition of the foaming agent in the composition to an extent of 15 to 85% and the second heating carried out at a higher temperature than the first heating to effect complete decomposition of the remaining foaming agent and the cross-linking agent.

In the method of this invention for the manufacture of an electroconductive cross-linked polyolefin foam, it is permissible that the polyolefin resin composition may be cross-linked in advance of the step of foaming. This preliminary cross-linking may be effected either by use of a cross-linking agent or by irradiation with an electron beam.

This modification to the first method constitutes itself the second method. This second method may be further divided into the following two versions: The first version which comprises blending 100 parts by weight of a polyolefin with 10 to 30 parts by weight of carbon particles and suitable amounts of a foaming agent and a cross-linking agent, heating the resultant cross-linkable, foamable composition in a mold under application of pressure to a temperature at which the foaming agent is not substantially decomposed thereby cross-linking the composition, and then heating the resultant cross-linked foamable composition under atmospheric pressure so as to allow the composition to be foamed without being abruptly foamed or expanded, and the second version which comprises blending 100 parts by weight of a polyolefin with 10 to 30 parts by weight of carbon particles and a suitable amount of a foaming agent, irradiating the resultant foamable composition with an electron beam thereby cross-linking the composition, and then heating the resultant cross-linked foamable composition under atmospheric pressure so as to allow the composition to be foamed without being abruptly foamed or expanded.

In either of the two versions of the second method described above, it is naturally permissible and desirable that the composition may be shaped to a desired shape either during or prior to the step of cross-linking and that the foaming of the composition by the aforementioned heating under a atmospheric pressure may be carried out in two separate steps of heating, i.e., the first and second step of heating as described above.

By any of the aforementioned various methods contemplated by this invention, there is obtained an electroconductive cross-linked polyolefin foam wherein carbon particles are contained substantially in the shape of chains in the cell membranes of the cross-linked polyolefin foam.

Here, the effect of the speed of volume increase, i.e. the speed of foaming per unit time (one minute) (hereinafter referred to as "gradient of foaming speed"), upon the electroconductivity will be described below with reference to an experiment.

Experiment 1

A composition consisting of 100 parts by weight of ethylene-vinyl acetate copolymer (a product of Mitsui Polychemical Co., Ltd. having a vinyl acetate content of 14% by weight, marketed under trademark designation of "Everflex P-1403"), 13.0 parts by weight of furnace carbon black (oil absorption; 350 ml/100 g), 14.0 parts by weight of azo-dicarbonamide (a product of Eiwa Chemical Industry Co., Ltd., marketed under trademark designation of Vinyhol AC50S) as a foaming agent, and varying amounts of a foaming aid and a cross-linking agent (dicumyl peroxide; DCP) indicated in Table 1 was intimately kneaded in a mixing roll. The kneaded product was placed in a mold (150×150×7 mm) heated to 120° C. and held in a press and heated under application of pressure for 5 minutes to afford a cross-linkable and foamable sheet. Then, this sheet was heated for 40 minutes in a salt bath (mixed fused salt of sodium nitrate, potassium nitrate, and sodium nitrite) at 170° C. During the heating, the foaming system was measured for expansion ratio and electric resistance at fixed intervals. The results were as shown in Table 2. The gradient of foaming speed was expressed with the differences of expansion ratio found at the intervals of the measurement. The magnitude of resistance was determined in terms of insulation resistance in the longitudinal direction of a test specimen 10×10×50 mm and the insulation resistance meter used for this test was a product of Yokogawa Electric Works Co., Ltd., marketed under designation of TYPE 3213.

TABLE 1

| Test specimen | Foaming aid | | Cross-linking agent - DCP |
|---|---|---|---|
| | Zinc white | Zinc stearate | (parts by weight) |
| A | 0.1 | — | 0.7 |
| B | 2.0 | 2.0 | 1.2 |
| C | 1.0 | 1.0 | 1.2 | drawing that the magnitude of electric resistance is proportional substantially linearly to the gradient of foaming speed. Generally when the magnitude of electric resistance possessed exceeds 100 MΩ, the electroconductive polyolefin foam lacks market value. It is, therefore, necessary that the magnitude of electric resistance of the electroconductive cross-linked polyolefin foam should be kept below 100 MΩ, preferably below 50 MΩ (particularly desirably below 2 MΩ). For this purpose, it is desirable that the composition should be foamed under conditions such that the gradient of foaming speed will remain below 20, preferably below 10, and especially below 1.0. It is noted from Tables 1, 2 and the drawing that the gradient of foaming speed is affected by the amount of foaming aid added to the composition. In other words, the inclination of the straight line indicated in the diagram loses steepness in proportion as the amount of the foaming aid added is decreased. When the amount of the foaming aid is fixed, the gradient of foaming speed must be decreased in proportion as the amount of the cross-linking agent is increased. So far as the amounts of the cross-linking agent, the foaming agent, and the foaming aid fall within the ranges of normal use, an electroconductive cross-linked polyolefin foam having electric resistance of a value of not more than 100 MΩ can be obtained by limiting the added amount of carbon particles to within the range of 10 to 30 parts by weight and adopting the method of foaming under atmospheric pressure. In actually working the present invention, it is a wise practice to determine experimentally the amounts of the cross-linking agent, the foaming agent, and optionally the foaming aid which are required for a given polyolefin resin to produce, by the method of this invention, an electroconductive foam having electric resistance of a value of not more than 100 MΩ and, then in the actual manufacture of the foam, select these agents within the ranges determined as above.

The aforementioned effect exerted by the gradient of foaming speed upon the magnitude of electric resistance may be accounted for as follows. The abrupt expansion of the composition incorporating carbon selectively causes the resin component in the composition to be drawn out while the carbon particles remain intact, with the result that the chains of carbon particles are brought to a broken state. Conversely when the expansion of the composition is gradual, it is suspected that

TABLE 2

| | Test specimen | | | | | | | | |
|---|---|---|---|---|---|---|---|---|---|
| | A | | | B | | | C | | |
| Foaming Time (min.) | Expansion ratio | Resistance (MΩ) | Gradient (E.R./min.) | Expansion ratio | Resistance (MΩ) | Gradient (E.R./min.) | Expansion ratio | Resistance (MΩ) | Gradient (E.R./min.) |
| 1 | — | — | — | 1.11 | 0.2 | 0.11 | 1.17 | 0.4 | 0.17 |
| 2 | — | — | — | 1.28 | 0.3 | 0.17 | 1.25 | 0.4 | 0.08 |
| 3 | — | — | — | 1.65 | 1.2 | 0.37 | 1.46 | 0.6 | 0.21 |
| 4 | — | — | — | 9.07 | 70.0 | 7.43 | 2.94 | 9.0 | 1.48 |
| 5 | 1.77 | 0.8 | 0.15 | 26.78 | ∞ | 17.7 | 16.92 | 50.0 | 13.98 |
| 6 | — | — | — | | | | | | |
| 7 | — | — | — | | | | | | |
| 10 | 4.36 | 1.3 | 0.52 | | | | | | |
| 15 | 7.09 | 2.0 | 0.55 | | | | | | |
| 20 | 9.74 | 1.7 | 0.53 | | | | | | |
| 25 | 11.94 | 1.6 | 0.44 | | | | | | |
| 30 | 13.79 | 1.3 | 0.37 | | | | | | |
| 35 | 14.93 | 1.2 | 0.23 | | | | | | |
| 40 | 15.46 | 1.1 | 0.11 | | | | | | |

The accompanying drawing represents the results of the experiment shown in Table 2 as plotted on a logarithm-logarithm section graph. It is noted from the stress is exerted on not merely the resin component but also the carbon particles in the composition and chains of carbon particles are completed in a more or less deformed pattern and, consequently, the individual carbon particles approach one another at a distance within several angstroms (Å) and serve to maintain electroconductivity in the produced foam.

Now, the steps involved in the method of this invention for the manufacture of an electroconductive cross-linked polyolefin foam will be specifically described below.

In the first method, a polyolefin is intimately kneaded with carbon particles, a foaming agent, a cross-linking agent, and optionally a foaming aid, a filler, and a pigment as in a mixing roll. Then, the resultant mixed composition is desirably placed in a metal mold having a desired profile of cavity and subjected to thermal shaping under pressure applied with a press at a temperature selected in the range of 115° to 155° C., preferably 120° to 140° C., depending on the kinds of the resin and the cross-linking agent. Otherwise, the composition resulting from the aforementioned kneading may be placed in the metal mold and shaped therein only under application of pressure instead of being shaped under application of heat and pressure as described above. Alternatively, the same composition may be shaped directly by the use of an extruder or a calender roll. It should be noted that the heating which is made in the step of shaping is intended to bring the foamable and cross-linkable composition into a thermally excited state in preparation for the subsequent foaming and cross-linking steps and enabling the cross-linking agent and the foaming agent to be smoothly decomposed in such subsequent steps. Besides, this heating aids in production of uniform minute cells in the composition. Thus, the step of shaping is desired to be carried out under application of heat.

In this step of thermal shaping of the composition, a very small portion of the foaming agent may undergo initial decomposition. When the shaped composition is released from the metal mold, therefore, it may possibly expand to about twice the original volume. This expansion is far from the concept of foaming and has absolutely no adverse effect on this invention.

The foamable and cross-linkable composition which has been shaped as described above is then heated under atmospheric pressure, so that the cross-linking agent and the foaming agent may be decomposed. In the foaming and cross-linking step, the shaped polyolefin composition is placed in an open-shut metal mold of non-airtight construction, heated therein for a fixed length of time as immersed in a metal bath using Rose's metal or Wood's metal, an oil bath, or a salt bath using at least one fused salt selected from among sodium nitrate, potassium nitrate, potassium nitrite, etc., held under a current of nitrogen, or covered with an expansible iron sheet, and then cooled to afford the foam aimed at. The heating temperature is selected in the range of 150° to 200° C., preferably 160° to 190° C. and the heating time in the range of 10 to 90 minutes, preferably 15 to 40 minutes, depending on the kinds of the polyolefin to be used.

In the present invention, the heating in the aforementioned foaming and cross-linking step may be carried out in two separate steps. If the heating is performed in the two separate steps, then the conditions for the foaming and cross-linking are moderated and the decomposition of the cross-linking agent and the foaming agent are made to proceed more gradually. The idea of carrying out the foaming and cross-linking step in two separate steps is primarily aimed at uniformizing the application of heat to the foaming and cross-linking composition, namely eliminating the uneven application of heat in the direction of the thickness of the aforementioned composition. By adoption of the two-step heating treatment, otherwise possible partially uneven foaming is precluded and the attendant adverse phenomena such as surface cracking, curling, and gas leading are prevented. This two-step foaming and cross-linking treatment proves to be particularly effective when the foam finally produced is required to have a large thickness or when the foam is desired to have been foamed at a high expansion ratio of the order of 15 or more, for example. This two-step foaming and cross-linking treatment is specifically effected by causing the aforementioned foamable and cross-linkable composition shaped in the press mold, in the first step of foaming and cross-linking, to be heated for 5 to 60 minutes, preferably 10 to 45 minutes, by the aforementioned heating method involving immersion of the composition as in a metal bath, under a current of nitrogen maintained at a fixed temperature in the range of 145° to 170° C., and then removing the resultant intermediate from the system of the first step, placing it in an open-shut metal mold of non-airtight construction, heating it for 5 to 50 minutes; preferably 15 to 40 minutes by the aforementioned heating method as immersed in an metal bath, under a current of nitrogen maintained at a fixed temperature in the range of 160° to 200° C., and cooling the heated composition. Consequently, there is obtained a foam of low density. The aforementioned first foaming and cross-linking step is desired to effect decomposition of 15 to 85% of the foaming agent in the composition (with the gel percent of the composition accounting for about 20 to 85%). If the decomposition ratio of the foaming agent and the gel percent are excessively high, then the significance of the separation of the treatment into two steps is lost and the aforementioned effect of the two-step treatment is not obtained.

In the second method of this invention, the resin as the principal component of the composition is cross-linked before the composition reaches the aforementioned foaming step. When the cross-linking involves use of a cross-linking agent, the cross-linkable and foamable composition having carbon particles incorporated therein is placed in a metal mold accommodated or set up within a press, for example, and heated at a temperature at which the foaming agent is not substantially decomposed, i.e., a temperature in the range of 130 to 160° C., though variable to some extent with the kind of the foaming agent in use or, when a foaming aid is additionally used, a temperature in the neighborhood of 140° C., to effect the cross-linking of the aforementioned composition. Otherwise, the cross-linking may be accomplished by irradiating the foamable composition incorporating carbon particles with an electron beam. The foaming step which follows the cross-linking step is similar to that involved in the first method, except that the cross-linking and foaming step gives way to the foaming step.

As carbon particles for use in the present invention, electroconductive carbon black proves to be particularly desirable and to be suitable for the commercialization of the method of this invention because it possesses a highly developed structure and its particles have a small diameter enough for thorough dispersion in the polyolefin. Among other grades of carbon black, the furnace carbon black and the acetylene black are used particularly advantageously. The channel carbon black suitable for addition to rubber and its equivalents are also usable. The amount of carbon particles to be incorporated in the composition is required to fall in the range of 10 to 30 parts by weight, preferably 12 to 20 parts by weight, based on 100 parts by weight of the polyolefin. If the content of carbon particles is less than 10 parts by weight, the supply of carbon particles is not sufficient for the formation of carbon chains and, consequently, the produced foam offers infinite resistance. If the content of carbon particles exceeds 30 parts by weight, the foam cannot be obtained at a high expansion ratio. The highest possible expansion ratio for this foam is 2 to 3 at most.

The term "polyolefin" as used in the present invention embraces various grades of polyethylene produced by the high-, medium-, and low-pressure methods, poly-1,2-butadiene, ethylene-propylene copolymer, ethylene-butene copolymer, ethylene-vinyl acetate copolymer, copolymers of ethylene with up to 45% by weight of methyl-, ethyl-, propyl-, and butyl-acrylates or -methacrylates, their chlorinated derivatives (with the chlorine content limited to 60% by weight), mixtures of two or more of the polymers mentioned above, and mixtures thereof with polypropylene having an atactic or isotactic structure.

The term "cross-linking agent" as used in the present invention means as organic peroxide serving as a radical generator which, in the aforementioned polyolefin, has a decomposition temperature at least higher than the flow-starting temperature of the polyolefin and is decomposed on exposure to heat to generate a free radical and produce linkage within or between the molecules of the polyolefin. Examples of the organic peroxide include, but are not limited to: dicumyl peroxide, 1,1-di(-tert-butyl peroxy)-3,3,5-trimethyl cyclohexane, 2,5-dimethyl-2,5-di(tert-butyl peroxy) hexane, 2,5-dimethyl-2,5-di(tert-butyl peroxy) hexine, α,α-bis(tert-butyl peroxy) diisopropyl benzene, tertiary butyl peroxyketone, and tertiary butyl peroxybenzoate. It is important to select a particular organic peroxide which best suits the polyolefin to be used.

The foaming agent which can be used in the present invention is a chemical foaming agent having a decomposition temperature higher than the melting point of the aforementioned polyolefin. Examples of the foaming agent satisfying this requirement include, but are not limited to: azo type compounds such as azo-dicarbonamides and barium azo-dicarboxylates; nitroso type compounds such as dinitroso-pentamethylene tetramine and trinitroso-trimethyl triamine; hydrazide type compounds such as p,p'-oxybisbenzene sulfonyl hydrazide; and sulfonyl semicarbazide type compounds such as p,p'-oxybisbenzene sulfonyl semicarbazide and triene sulfonyl semicarbazide.

The present invention permits additional incorporation of a foaming aid, depending on the kind of the foaming agent to be used. Examples of the foaming aid include, but are not limited to: compounds having urea as a main component; metal oxides such as zinc oxide and lead oxide; and compounds having salicylic acid, stearic acid, etc. as main components, namely, higher fatty acids or metal compounds of higher fatty acids.

The present invention, for the purpose of improving the physical properties of the composition to be used or lowering the cost of the product, permits additional incorporation of additives (fillers) incapable of producing any noticeable adverse effect upon the cross-linking of the composition. Examples of such additives include, but are not limited to: metal oxides such as zinc oxide, titanium dioxide, calcium oxide, magnesium oxide, and silicon oxide; carbonates such as magnesium carbonate and calcium carbonate; fibrous substances such as pulp; dyestuffs; pigments; fluorescent substances; and agents usually added to rubber.

Now, the present invention will be described more specifically below with reference to working examples. Naturally, this invention is not limited in any sense by the examples to be cited herein below.

EXAMPLE 1

A composition consisting of 100 parts by weight of ethylene-vinyl acetate copolymer (a product of Mitsui Polychemical Co., Ltd. having a vinyl acetate content of 14% by weight, marketed under trademark designation of "Everflex P-1403"), 13.0 parts by weight of furnace carbon black (oil absorption: 350 ml/100 g), 14.0 parts by weight of azo-dicarbonamide (a product of Eiwa Chemical Industry Co., Ltd., marketed under trademark designation of Vinyhol AC50S), 0.1 part by weight of zinc white, and 0.7 part by weight of dicumyl peroxide was intimately kneaded in a mixing roll. The kneaded product was placed in a mold ($150 \times 150 \times 7$ mm) heated to 120° C. and held in a press and heated under application of pressure for 5 minutes to afford a cross-linkable, foamable sheet. Then, this cross-linkable, foamable sheet was heated for 40 minutes in a salt bath (mixed fused salt of sodium nitrate, potassium nitrate, and sodium nitrite) at 170° C. Consequently, the sheet foamed and gave rise to an electroconductive foam. The foam thus obtained had a thickness of 23 mm and an apparent density of 0.065 g/cm$^3$ and, on measurement, showed electric resistance of $1.10 \times 10^6 \Omega$. This was a fine electroconductive cross-linked foam enjoying good appearance.

The electric resistance was measured with an insulation resistance meter, Type 3213 (500 V/100 MΩ), made by Yokogawa Electric Works Co., Ltd. and designed to register the magnitude of the electric resistance offered lengthwise within the rectangular parallelipiped, $1 \text{ cm} \times 1 \text{ cm} \times 5 \text{ cm}$, of a given test piece.

EXAMPLES 2-3

The procedure of Example 1 was faithfully repeated, except that the amount of carbon black incorporated in the compoposition was varied as shown in Table 3, to afford electroconductive foams. These foams showed electric resistance of $0.12 \times 10^6 \Omega$ (Example 2) and $0.05 \times 10^6 \Omega$ (Example 3) and, thus, proved to be fine electroconductive foams.

EXAMPLE 4

The procedure of Example 1 was faithfully repeated, except that 20 parts by weight of acetylene black (oil absorption: 250 ml/100 g) as indicated in Table 3 was used instead of the furnace carbon black of Example 1, to afford an electroconductive foam. This foam showed electric resistance of $0.2 \times 10^6 \Omega$ and proved to be a fine electroconductive foam.

EXAMPLE 5

Entirely the same composition as used in Example 1 was kneaded and press heated by faithfully following the procedure of Example 1, to afford a cross-linkable, foamable sheet. This electroconductive cross-linkable, foamable sheet was heated for 15 minutes in a salt bath at 180° C. to produce an electroconductive foam. This foam was found to be an electroconductive product having an apparent density of 0.048 g/cm$^3$ and electric resistance of $1.7 \times 10^6 \Omega$.

EXAMPLE 6

By following the procedure of Example 1, a composition consisting of 100 parts by weight of low-density polyethylene (a product of Mitsubishi Petrochemical Co., Ltd., marketed under trademark designation of Yukalon LK-30), 15 parts by weight of furnace carbon black (oil absorption: 350 ml/100 g), 14 parts by weight of azo-dicarbonamide, 0.2 part by weight of zinc white, and 0.8 part by weight of dicumyl peroxide was cross-linked and foamed under the same conditions as those of Example 1, to afford an electroconductive foam showing electric resistance of $0.12 \times 10^6 \Omega$.

EXAMPLE 7

Entirely the same composition as used in Example 1 was kneaded intimately in a mixing roll kept at 105° C., placed in a metal mold (150×150×18 mm) set up within a press kept at 133° C. and heated therein for 25 minutes under application of pressure, to effect shaping of a cross-linkable, foamable block. This cross-linkable, foamable block was heated for 25 minutes in a salt bath at 160° C. to obtain an intermediate wherein 30% of the foaming agent had been decomposed. The intermediate was placed in an one-shut non-airtight metal mold (390×390×50 mm) and then heated for 30 minutes in a salt bath at 175° C. to effect complete decomposition of the remaining unaltered foaming agent. The resultant foam was cooled and removed from the metal mold. This foam was a thick electroconductive product having a thickness of 48 mm and showing an apparent density of 0.045 g/cm$^3$ and electric resistance of $0.3 \times 10^6 \Omega$.

EXAMPLE 8

The procedure of Example 7 was faithfully repeated, except that the amounts of carbon black and cross-linking agent were varied as shown in Table 3, to afford an electroconductive foam 48 mm in thickness. This foam showed electric resistance of $0.05 \times 10^6 \Omega$ and proved to be a fine thick electroconductive foam.

In the intermediate produced in the course of the experiment, 35% of the foaming agent had been decomposed.

EXAMPLE 9

Entirely the same composition as used in Example 6 was intimately kneaded and then cross-linked and foamed under the same conditions as those of Example 7, to afford an electroconductive foam showing electric resistance of $0.08 \times 10^6 \Omega$. In the intermediate obtained in the course of the experiment, 30% of the foaming agent had been decomposed.

EXAMPLE 10

Entirely the same composition as used in Example 4 was intimately kneaded and then cross-linked and foamed under the same conditions as those of Example 7. The foam finally obtained was an electroconductive product showing electric resistance of $0.1 \times 10^6 \Omega$. In the intermediate obtained in the course of the experiment, 30% of the foaming agent had been decomposed.

EXAMPLE 11

A composition similar to the composition of Example 1 except for the omission of zinc white was intimately kneaded in a mixing roll kept at 105° C., placed in a metal mold (150×150×7 mm) set up on a press kept at 158° C., and heated therein for 25 minutes to effect cross-linking of the composition. Consequently, there was obtained a cross-linked foamable sheet.

Then, the cross-linked foamable sheet was heated for 40 minutes in a salt bath at 175° C. to effect foaming of the sheet and afford an electroconductive foam. The electroconductive foam showed electric resistance of $2.0 \times 10^6 \Omega$.

EXAMPLE 12

A composition similar to the composition of Example 1 except for the omission of the cross-linking agent was intimately kneaded in a mixing roller kept at 105° C. Then, the composition was fed to an extruder (L/D=20) to produce a foamable sheet 3 mm in thickness.

This foamable sheet was irradiated with 3.5 MRd of electron beam issued from an electron generator to produce a cross-linked foamable sheet. The cross-linked foamable sheet was heated in a salt bath under the same conditions as those of Example 1, to afford an electroconductive foamed sheet showing electric resistance of $0.12 \times 10^6 \Omega$.

EXAMPLE 13

Entirely the same composition as used in Example 1 was intimately kneaded under the same conditions as those of Example 1. The resultant composition was fed to an extruder (L/D=20) to produce a cross-linkable, foamable sheet 5 mm in thickness. The conditions for the extrusion were cylinder temperatures 100° C. for $C_1$, 102° C. for $C_2$, and 107° C. for $C_3$ and extrusion ratio of 2.7 kg/hr.

Then, the cross-linking, foaming sheet mentioned above was heated under entirely the same conditions as those of Example 1 to effect cross-linking and foaming of the sheet and afford an electroconductive foamed sheet having electric resistance of $1.0 \times 10^6 \Omega$.

COMPARATIVE EXAMPLE 1

A composition similar to the composition of Example 7 except that the amount of carbon black added was varied to 9.0 parts by weight was kneaded intimately under the same conditions as those of Example 1 and then press heated to afford a cross-linkable, foamable sheet. This cross-linkable, foamable sheet was heated under the same conditions as those of Example 7, to produce a foam. The foam showed an apparent density of 0.040 g/cm$^3$ and infinite electric resistance. Thus, the foam could not be evaluated as an electroconductive foam.

TABLE 3

| No. of Examples | Resin (100 parts by weight) | Carbon black | | Foaming agent AC50S | Foaming aid | | Cross-linking agent (DCP) | Press conditions | | One-step of cross-linking and foaming | |
|---|---|---|---|---|---|---|---|---|---|---|---|
| | | Furnace black | Acetylene black | | Zinc white | Zinc stearate | | Temperature (°C.) | Time (min) | Temperature (°C.) | Time (min) |

TABLE 3-continued

| | | | | | | | | | | |
|---|---|---|---|---|---|---|---|---|---|---|
| 1 | Everflex P-1403 | 13.0 | — | 14.0 | 0.1 | — | 0.7 | 120 | 5 | 170 | 40 |
| 2 | Everflex P-1403 | 15.0 | — | 14.0 | 0.1 | — | 0.7 | 120 | 5 | 170 | 40 |
| 3 | Everflex P-1403 | 18.0 | — | 14.0 | 0.1 | — | 0.7 | 120 | 5 | 170 | 40 |
| 4 | Everflex P-1403 | — | 20 | 14.0 | 0.1 | — | 0.7 | 120 | 5 | 170 | 40 |
| 5 | Everflex P-1403 | 13.0 | — | 14.0 | 0.1 | — | 0.7 | 120 | 5 | 180 | 15 |
| 6 | Yukalon LK-30 | 15.0 | — | 14.0 | 0.2 | — | 0.8 | 120 | 5 | 180 | 15 |
| 7 | Everflex P-1403 | 13.0 | — | 14.0 | 0.1 | — | 0.7 | 133 | 25 | — | — |
| 8 | Everflex P-1403 | 15.0 | — | 14.0 | 0.1 | — | 0.8 | 133 | 25 | — | — |
| 9 | Yukalon LK-30 | 15.0 | — | 14.0 | 0.2 | — | 0.8 | 133 | 25 | — | — |
| 10 | Everflex P-1403 | — | 20 | 14.0 | 0.1 | — | 0.7 | 133 | 25 | — | — |
| 11 | Everflex P-1403 | 13.0 | — | 14.0 | — | — | 0.7 | 158 (cross-linked) | | 175 | 40 |
| 12 | Everflex P-1403 | 13.0 | — | 14.0 | 0.1 | — | — | Extruded and irradiated with electron beam | | 170 | 40 |
| 13 | Everflex P-1403 | 13.0 | — | 14.0 | 0.1 | — | 0.7 | Extruded | | 170 | 40 |

| | Two-step of cross-linking and foaming | | | | | |
|---|---|---|---|---|---|---|
| | First step | | Second step | | | |
| No. of Examples | Temperature (°C.) | Time (min) | Temperature (°C.) | Time (min) | Density of foam (g/cm³) | Electric resistance (× 10⁶Ω) |
| 1 | — | — | — | — | 0.065 | 1.10 |
| 2 | — | — | — | — | 0.067 | 0.10 |
| 3 | — | — | — | — | 0.096 | 0.05 |
| 4 | — | — | — | — | 0.070 | 0.20 |
| 5 | — | — | — | — | 0.048 | 1.70 |
| 6 | — | — | — | — | 0.065 | 0.12 |
| 7 | 160 | 25 | 175 | 30 | 0.041 | 0.30 |
| 8 | 160 | 25 | 175 | 30 | 0.045 | 0.05 |
| 9 | 160 | 25 | 175 | 30 | 0.043 | 0.08 |
| 10 | 160 | 25 | 175 | 30 | 0.048 | 0.10 |
| 11 | — | — | — | — | 0.069 | 2.0 |
| 12 | — | — | — | — | 0.065 | 1.20 |
| 13 | — | — | — | — | 0.062 | 1.0 |

What we claim is:

1. A method for the manufacture of an electroconductive cross-linked polyolefin foam, which comprises: kneading 100 parts by weight of a polyolefin, 10 to 30 parts by weight of particles of a conductive carbon black, and suitable amounts of a foaming agent and a cross-linking agent, and heating the resultant cross-linkable and foamable composition under atmospheric pressure and at a temperature not more than 200° C. so that the gradient of foaming speed is maintained at 10 or less, thereby allowing the composition to be cross-linked and foamed without being abruptly foamed or expanded, wherein the gradient of foaming speed is the change of the expansion ratio per one minute.

2. The method according to claim 1, wherein said cross-linkable and foamable composition, prior to said heating under atmospheric pressure, is shaped to a desired shape under application of pressure and heat such that the foaming agent will not be substantially decomposed.

3. The method according to claim 1, wherein said cross-linking and foaming of the cross-linkable and foamable composition by said heating under atmospheric pressure is carried out in two separate steps, the first step for heating the composition to effect decomposition of 15 to 85% of the foaming agent in the composition and the second step for heating the composition at a temperature higher than the temperature involved in the first step to effect complete decomposition of the remaining unaltered foaming agent and cross-linking agent.

4. The method according to claim 1 or claim 3, wherein the foaming of the composition by the heating under atmospheric pressure is carried out so that the gradient of foaming speed will be not more than 1.

5. The method according to claim 4, wherein said gradient of foaming speed is adjusted by incorporation of a foaming aid to the composition.

6. The method according to claim 2, wherein the shaping temperature falls in the range of 115° to 155° C.

7. The method according to claim 1, wherein the heating temperature during the cross-linking and foaming step performed on the cross-linkable and foamable composition falls in the range of 150° to 200° C.

8. The method according to claim 3, wherein the heating temperature during the cross-linking and foaming step falls in the range of 145° to 170° C. in the first separate step and in the range of 160° to 200° C. in the second separate step.

9. The method according to claim 1 or claim 3, wherein the heating of the cross-linkable and foamable composition is carried out in a metal bath, an oil bath, or a salt bath or under a current of nitrogen gas.

10. A method for the manufacture of an electroconductive cross-linked polyolefin foam, which comprises:
kneading 100 parts by weight of a polyolefin, 10 to 30 parts by weight of particles of a conductive carbon black, and suitable amounts of a foaming agent and a cross-linking agent,
heating the resultant cross-linkable and foamable composition in a metal mold held under pressure to a temperature at which the foaming agent is not substantially decomposed thereby cross-linking the composition, and
heating the resultant foamable, cross-linked composition under atmospheric pressure and at a temperature not more than 200° C. so that the gradient of foaming speed is maintained at 10 or less, thereby allowing the composition to be foamed without being abruptly foamed or expanded,
wherein the gradient of foaming is the change of the expansion ratio per one minute.

11. The method according to claim 10, wherein said foaming of the cross-linked foamable composition by said heating under atmospheric pressure is carried out in two separate steps, the first step for heating the composition to effect decomposition of 15 to 85% of the foaming agent in the composition and the second step for heating the composition at a temperature higher than the temperature involved in the first step to effect complete decomposition of the remaining unaltered foaming agent.

12. The method according to claim 10 or claim 11, wherein the foaming of the composition by the heating under atmospheric pressure is carried out so that the gradient of foaming speed will be not more than 1.

13. The method according to claim 12, wherein said gradient of foaming speed is adjusted by incorporation of a foaming aid to the composition.

14. The method according to claim 10, wherein the heating temperature during the cross-linking step falls in the range of 130° to 160° C.

15. The method according to claim 10, wherein the heating temperature during the foaming step falls in the range of 150° to 200° C.

16. The method according to claim 11, wherein the heating temperature during the foaming step falls in the range of 145° to 170° C. in the first separate step and in the range of 160° to 200° C. in the second separate step.

17. The method according to claim 10 or claim 11, wherein the heating of the foamable composition is carried out in a metal bath, an oil bath, or a salt bath or under a current of nitrogen gas.

18. A method for the manufacture of an electroconductive cross-linked polyolefin foam, which comprises kneading 100 parts by weight of a polyolefin, 10 to 30 parts by weight of particles of a conductive carbon black, and a suitable amount of a foaming agent,
irradiating the resultant foamable composition with an electron beam thereby cross-linking the composition, and
heating the resultant cross-linked foamable composition under atmospheric pressure and at a temperature of not more than 200° C. so that the gradient foaming speed is maintained at 10 or less, thereby allowing the composition to be foamed without being abruptly foamed or expanded,
wherein the gradient of foaming speed is the change of the expansion ratio per one minute.

19. The method according to claim 18, wherein said foaming of the cross-linked foamable composition by said heating under atmospheric pressure is carried out in two separate steps, the first step for heating the composition to effect decomposition of 15 to 85% of the foaming agent in the composition and the second step for heating the composition at a temperature higher than the temperature involved in the first step to effect complete decomposition of the remaining unaltered foaming agent.

20. The method according to claim 18 or claim 19, wherein the foaming of the composition by the heating under atmospheric pressure is carried out so that the gradient of foaming speed will be not more than 1.

21. The method according to claim 20, wherein said gradient of foaming speed is adjusted by incorporation of a foaming aid to the composition.

22. The method according to claim 18, wherein the heating temperature during the foaming step falls in the range of 150 to 200° C.

23. The method according to claim 19, wherein the heating temperature during the foaming step falls in the range of 145° to 170° C. in the first separate step and in the range of 160° to 200° C. in the second separate step.

24. The method according to claim 18 or claim 19, wherein the heating of the foamable composition is carried out in a metal bath, an oil bath, or a salt bath or under a current of nitrogen gas.

* * * * *